United States Patent
Scheessele et al.

(10) Patent No.: US 9,066,323 B2
(45) Date of Patent: Jun. 23, 2015

(54) AD HOC NETWORK CONNECTION

(71) Applicant: Hewlett-Packard Development Company, L.P., Fort Collins, CO (US)

(72) Inventors: Evan Scheessele, Corvallis, OR (US); Ronald MacKenzie Alexander, Monmouth, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 156 days.

(21) Appl. No.: 13/677,558

(22) Filed: Nov. 15, 2012

(65) Prior Publication Data

US 2014/0134999 A1     May 15, 2014

(51) Int. Cl.
| | | |
|---|---|---|
| *H04B 5/00* | (2006.01) | |
| *H04M 1/00* | (2006.01) | |
| *H04W 76/02* | (2009.01) | |

(52) U.S. Cl.
CPC ............... *H04W 76/02* (2013.01); *Y02B 60/50* (2013.01)

(58) Field of Classification Search
CPC ....... H04W 4/02; H04W 64/00; H04W 84/18; H04W 88/06; H04W 8/005; H04W 36/0083; H04W 36/14; H04W 36/32; H04W 84/12; H04W 92/18
USPC ......... 455/436–444, 41.1–41.3, 552.1, 553.1, 455/426.1
See application file for complete search history.

(56) References Cited

U.S. PATENT DOCUMENTS

| | | | |
|---|---|---|---|
| 6,721,286 B1 | 4/2004 | Williams et al. | |
| 7,254,400 B1 * | 8/2007 | Sakakura | 455/456.1 |
| 7,352,485 B2 | 4/2008 | Kinoshita | |
| 7,573,904 B2 | 8/2009 | Pichna et al. | |
| 8,027,049 B2 | 9/2011 | Kinoshita et al. | |
| 8,060,018 B2 | 11/2011 | Davis et al. | |
| 8,346,903 B2 | 1/2013 | Shepherd | |
| 2002/0051178 A1 | 5/2002 | Nakayasu et al. | |
| 2003/0011810 A1 | 1/2003 | Strobel et al. | |
| 2003/0210420 A1 | 11/2003 | Yamauchi | |
| 2003/0235174 A1 * | 12/2003 | Pichna et al. | 370/338 |
| 2004/0137855 A1 | 7/2004 | Wiley et al. | |

(Continued)

FOREIGN PATENT DOCUMENTS

| | | |
|---|---|---|
| JP | 2002026895 A | 1/2002 |
| WO | WO-2007082244 | 7/2007 |

OTHER PUBLICATIONS

I. Gruber, et al, "Ad Hoc Routing for Cellular Coverage Extension", Apr. 22-25, 2003, http://ieeexplore.ieee.org/xpls/abs_all.jsp?arnumber=1207137 > on pp. 1816-1820;vol. 3.

(Continued)

*Primary Examiner* — Daniel Lai
(74) *Attorney, Agent, or Firm* — Hewlett-Packard Patent Department (57) ABSTRACT

Example disclosed herein relate to an ad hoc network connection. A first mobile device initiates a request for an ad hoc wireless local area network (WLAN) connection with a second mobile device via a cellular network. Location information of the second mobile device is received and a distance of the second mobile device to the first mobile device is determined from the location information. If the distance is within a threshold, the first mobile device and the second mobile device exchange WLAN parameters and the ad hoc WLAN connection is established using the WLAN parameters.

20 Claims, 5 Drawing Sheets

(56) References Cited

U.S. PATENT DOCUMENTS

| | | | |
|---|---|---|---|
| 2005/0149755 A1 | 7/2005 | Shima et al. | |
| 2005/0170845 A1* | 8/2005 | Moran | 455/456.1 |
| 2006/0039349 A1* | 2/2006 | Samuel et al. | 370/351 |
| 2006/0087682 A1 | 4/2006 | Lee | |
| 2007/0124436 A1 | 5/2007 | Shepherd | |
| 2007/0217382 A1* | 9/2007 | Minamizawa | 370/338 |
| 2007/0265003 A1* | 11/2007 | Kezys et al. | 455/435.1 |
| 2008/0004075 A1 | 1/2008 | Horton | |
| 2008/0096486 A1 | 4/2008 | Whitten | |
| 2009/0287806 A1 | 11/2009 | Hamilton et al. | |
| 2009/0310570 A1 | 12/2009 | Smith | |
| 2009/0323659 A1 | 12/2009 | Zhang | |
| 2010/0185858 A1 | 7/2010 | Nishimi et al. | |
| 2010/0309510 A1 | 12/2010 | Hansen | |
| 2011/0099264 A1 | 4/2011 | Chapin et al. | |
| 2011/0242576 A1 | 10/2011 | Allen et al. | |
| 2012/0057193 A1 | 3/2012 | Jazayeri et al. | |
| 2012/0084364 A1* | 4/2012 | Sivavakeesar | 709/205 |
| 2012/0084771 A1* | 4/2012 | Hashimoto et al. | 717/176 |
| 2012/0218589 A1 | 8/2012 | Watanabe et al. | |
| 2012/0229844 A1 | 9/2012 | Yada et al. | |
| 2012/0268777 A1 | 10/2012 | Fry | |
| 2012/0307298 A1 | 12/2012 | Ishige et al. | |
| 2012/0324076 A1 | 12/2012 | Zerr et al. | |
| 2013/0016392 A1 | 1/2013 | Lee | |
| 2013/0063580 A1 | 3/2013 | Ogawa et al. | |
| 2013/0128306 A1 | 5/2013 | Takahashi | |
| 2013/0194623 A1 | 8/2013 | Tecu et al. | |
| 2013/0250330 A1 | 9/2013 | Chigusa | |
| 2013/0286425 A1 | 10/2013 | Nakamura et al. | |

OTHER PUBLICATIONS

Hewlett-Packard Development Company, L.P., "Cloud printing in the enterprise: Liberating the mobile print experience from cables, operating systems and physical boundaries," Mar. 2010, <http//www.hubtechnical.com/Collateral/Documents/English/-US/HP/11-CloudPrintingintheEnterprise.pdf>.

Hewlett-Packard Development Company, L.P., "HP Access Control Secure Pull Printing," Nov. 2008, <http://h71028.www7.hp.com/enterprise/downloads/HP-Access-Control-Secure-Pull-Printing.pdf>.

Apple Inc., "Messages," iOS, (web page), Oct. 29, 2012, <http://webarchive.org/web/20121029212402/http://www.apple.com/ios/messages/>.

Apple, "Features that go further," iOS 5, Sep. 10, 2012, <http://web.archive.org/web/20120910202047/http://www.apple.com/ios/features.html>.

Fernandes, L., "The mobile print enterprise," (Research Paper), Feb. 2012, 12 pages, available at http://w3.efi.com/~/media/Files/EFI/printme-mobile/Quocirca%20-%20The%20mobile%20print%20enterprise.pdf.

Grayson, Wayne; "Google Announces Web App for Printing from Mobile Device", Apr. 16, 2010; < http://grayson.blogs.tuscaloosanews.com/11308/google-announces-web-app-for-printing-from-mobile-device/>.

Hewlett-Packard Development Company, L.P., "HP ePrint Enterprise mobile printing solution," Mar. 2010, <http://www.hp.com/hpinfo/newsroom/press_kits/2010/MPSSpring2010/pdf/HP_ePrint.pdf>.

Hewlett-Packard Development Company, L.P., "HP ePrint Enterprise mobile printing solution," Sep. 2010, <http://www.hp.com/hpinfo/newsroom/press_kits/2010/InnovationSummit/HP_ePrint_Enterprise_Solution.pdf>.

TechTarget, "out-of-band signaling," SearchNetworking, Jan. 20, 2012, <http://web.archive.org/web/20120120154228/http://searchnetworking.techtarget.com/definition/out-of-band-signaling>.

Wikipedia, "Out-of-band management," Oct. 24, 2012, <http://en.wikipedia.org/w/index.php?title=Out-of-band_management&oldid=519500148>.

Wikipedia, "Wi-Fi Direct," Oct. 16, 2012, <http://en.wikipedia.org/w/index.php?title=Wi-Fi_Direct&oldid=518220509>.

Wikipedia, "Wi-Fi," Oct. 31, 2012, <http://en.wikipedia.org/w/index.php?title=Wi-Fi&oldid=520677838>.

* cited by examiner

AD HOC NETWORK CONNECTION

BACKGROUND

Mobile devices such as smartphones have become increasingly popular. Advances in technology have resulted in mobile devices that are capable of communicating over multiple network technologies. Users of such mobile devices often require high-bandwidth wireless network links to communicate using video conferencing applications, for example.

BRIEF DESCRIPTION OF THE DRAWINGS

The following detailed description references the drawings, wherein.

DETAILED DESCRIPTION

Various aspects of the present disclosure are directed to establishing an ad hoc network connection between mobile devices. More precisely, various aspects of the present disclosure are directed to leveraging cellular network connection for setting up and establishing an ad hoc wireless local area network (WLAN) connection between mobile devices.

Advances in mobile devices and mobile communication networks have occurred rapidly over the past few years. Mobile devices typically communicate voice and data over a cellular network. For example, mobile devices communicate over cellular networks such as second generation (2G) networks, third generation (3G) networks, fourth generation (4G) networks, long term evolution (LTE) networks, code division multiple access (CDMA) networks, global system for mobile communications (GSM) networks, and the like. Cellular networks require costly infrastructure (e.g., cellular base stations) to facilitate voice and data communication for mobile devices. For example, a first mobile device may communicate with a second mobile device over the cellular network via a base station that establishes a communication link between the first mobile device and the second mobile device. Base stations act as a central control (or access points) for the cellular network by negotiating communication parameters with the mobile devices.

Cellular networks suffer certain drawbacks. For example, cellular networks require high power/energy to transmit signal between mobile devices due to the long range covered by a base station connection the mobile devices. Thus, often the same amount of energy is used even when the communicating mobile devices are close to each other (e.g., a few hundred yards). Moreover, in certain conditions cellular networks (e.g., 2G) do not support high bandwidth for video communication between mobile devices. For example, in a scenario where 3G and 4G cellular networks are not available or otherwise would consume battery power (e.g., in a remote location), 2G cellular network may be available but may not provide sufficient bandwidth for video-based communication. In some situations, the available 3G and 4G network is still insufficient to support high bandwidth video conferencing.

Some existing solutions use wireless local area network (e.g., Wi-Fi) to provide high-bandwidth communication for mobile devices. However, Wi-Fi functions in an infrastructure mode similar to cellular networks where a hot-spot (e.g., a Wi-Fi access point) is required as an anchor/base station for the mobile devices. Moreover, many locations do not have Wi-Fi access points. Other existing solutions such as Wi-Fi Direct, a standard maintained by the Wi-Fi Alliance (an industry trade group), implements an automated Wi-Fi ah-hoc setup between mobile devices, thereby eliminating the need for an access point. However, this method requires bringing the two mobile devices close enough together (e.g., by touching) to trigger a pairing, and requires both devices to be within a line of sight of each other.

Accordingly, examples disclosed herein address these issues by implementing a wireless networking communications set up process to allow the establishment (e.g., temporary) of point-to-point high-bandwidth wireless network communications (e.g., Wi-Fi) in an ad hoc manner (i.e., non-infrastructure or no access points), where 'lean' cellular communications (e.g., 2G) are initially used between the mobile devices to validate sufficient proximity (e.g., via GPS data) for the Wi-Fi to be viable. Further, the cellular communication may be used to negotiate the Wi-Fi connection parameters such as Wi-Fi channel, power parameters, and data security parameters (e.g., encryption keys). As a result, power consumption of the mobile devices may be reduced while providing a high bandwidth ad hoc Wi-Fi connection between the mobile devices.

In one example in accordance with the present disclosure, a method for establishing an ad hoc network connection is provided. The method includes initiating, by a first mobile device, a request for an ad hoc wireless local area network (WLAN) connection with a second mobile device, where the request is sent via a cellular network. The method further includes receiving location information of the second mobile device and determining a distance of the second mobile device from the first mobile device from the location information. When the distance is within a threshold, the method includes exchanging WLAN parameters with the second mobile device and establishing the ad hoc WLAN connection with the second mobile device using the ad hoc WLAN parameters.

In another example in accordance with the present disclosure, a mobile device for establishing an ad hoc network connection is provided. The mobile device includes a cellular network interface to communicate over a cellular network and a wireless local area network (WLAN) interface to communicate over an ad hoc WLAN connection. The mobile device further includes a processor and a memory storing instructions executable by the processor. The instructions are executable to initiate a request for an ad hoc WLAN connection with a second mobile device, where the request is sent via the cellular network. The instructions are further executable to receive location information of the second mobile device and to determine a distance of the second mobile device from the location information. When the distance is within a threshold, the instructions are executable to exchange WLAN parameters with the second mobile device and to establish the ad hoc WLAN connection with the second mobile device using the WLAN parameters.

In still another example in accordance with the present disclosure, a non-transitory computer-readable medium is provided. The computer-readable medium includes instructions that, when executed by a processor of a mobile device, cause the mobile device to initiate a request for an ad hoc WLAN connection with a second mobile device, where the request is sent via a cellular network. The instructions, when executed, further cause the mobile device to receive location information of the second mobile device and to determine a distance of the second mobile device from the location information. When the distance is within a threshold, the instructions are executed to cause the mobile device to exchange WLAN parameters with the second mobile device and to establish the ad hoc WLAN connection with the second mobile device using the WLAN parameters.

Figure 1:
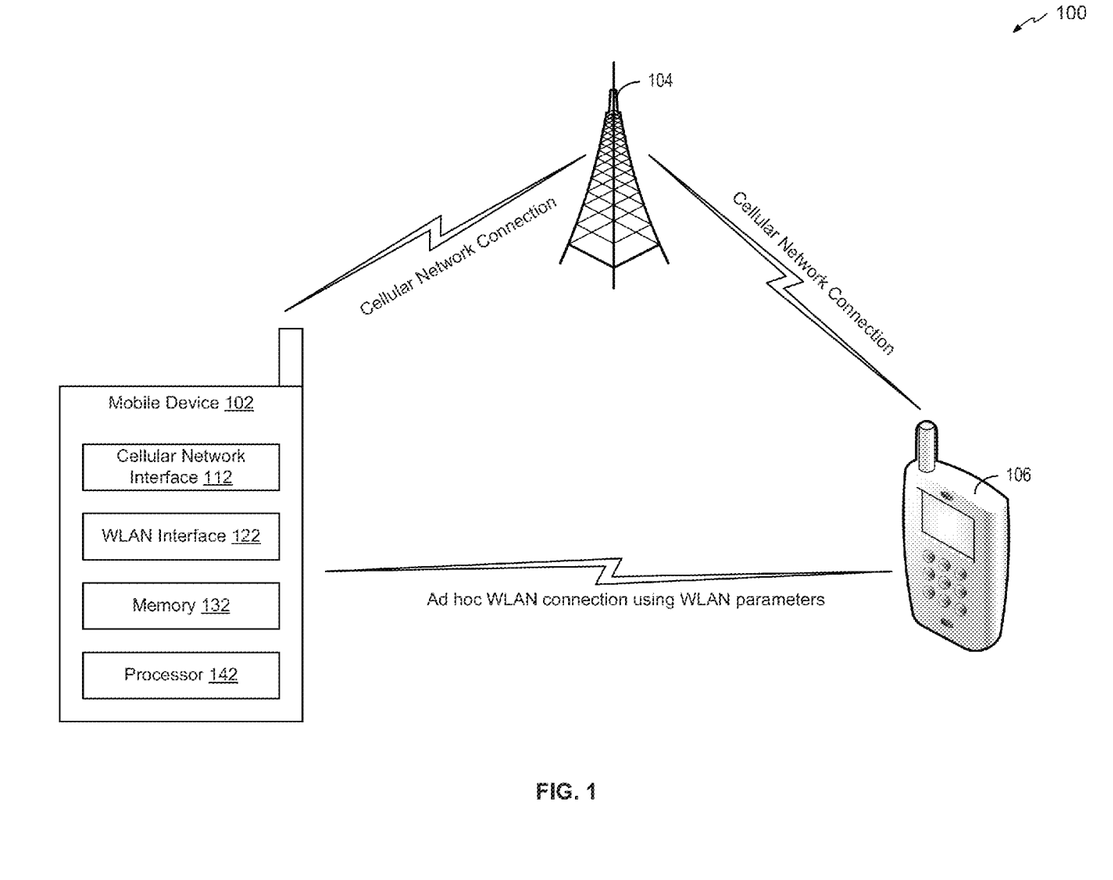
FIG. 1 is a block diagram of a mobile device for establishing an ad hoc network connection, according to one example.

FIG. 1 depicts a block diagram of a mobile device for establishing an ad hoc network connection, according to one example. Mobile device 102 includes a cellular network interface 112, a WLAN interface 122, memory 132, and a processor 142. Mobile device 102 may include at least one of a smartphone, a personal digital assistance (PDA), a handheld computer, a portable personal computer, a data communication device, and a portable reading device equipped with cellular network interface 112 and WLAN interface 122.

Cellular network interface 112 of the mobile device 102 may be configured to communicate with a cellular network. For example, cellular network interface 112 may facilitate communication with a cellular network infrastructure 104 such as a base station, where the cellular network infrastructure 104 supports and/or provides cellular communication services (e.g., voice and data) to a plurality of mobile devices including mobile device 102. For example, mobile device 102 may request and establish a cellular network connection with a second mobile device 106 via the cellular network infrastructure 104. Cellular network may include a 2G network, a 3G network, a 4G network, an LTE network, a GSM network, a universal mobile telecommunications system (UMTS) network, or a worldwide interoperability for microwave access (WiMAX) network, for example.

WLAN interface 122 of the mobile device 102 may be configured to communicate over an ad hoc WLAN connection. For example, WLAN interface 122 may establish an ad hoc WLAN (e.g., Wi-Fi) connection with second mobile device 106. Thus, WLAN interface 122 allows mobile device 102 to establish a point-to-point high-bandwidth wireless network communications (e.g., Wi-Fi) in an ad hoc fashion, where no infrastructures or access points are used. It should be noted that WLAN interface 122 may also support traditional WLAN connection via a WLAN access point (e.g., non ad hoc connection). WLAN interface 122 may include at least one of a high performance radio LAN (HiperLAN), an IEEE 802.15 interface, an IEEE 802.11 interface, or the like.

Mobile device 102 also includes memory 132 configured to store a plurality of instructions that may be executed by processor 142. Memory 132 may also store applications (e.g., video conferencing/chat applications) that are executable by processor 142. Thus, processor 142 may be configured to execute instructions to carry out the functionality of mobile device 102 described in details below.

During operation, mobile device 102 may initiate a request for an ad hoc WLAN connection with second mobile device 106 by sending the request to the cellular network. For example, a user of mobile device 106 may place a cellular voice call to a second user of second mobile device 106. The call may be routed to the second mobile device via cellular network infrastructure 104. In one example, the two users are in close proximity (e.g., within a few hundred yards) but still too far apart to shout and have no line of site to each other. Further, the users may desire to communicate using a high quality video conferencing application, where the existing cellular network connection (e.g., 2G or 3G) may not support such high-bandwidth video application. Thus, according to the described disclosure, an ad hoc WLAN connection may be established between mobile devices 102, 106 by leveraging the existing cellular network connection to validate sufficient proximity (e.g., via GPS data) for the ad hoc WLAN connection to be viable, and to negotiate WLAN connection parameters.

Accordingly, location information of the second mobile device 106 may be received by mobile 102 in response to initiating the ad hoc WLAN connection request. In certain examples, the location information of the second mobile device 106 is determined by the cellular network infrastructure 104. In other examples, location information is determined by the second mobile device 106 (e.g., via a GPS module of the second mobile device 106). Thus, the mobile devices 102, 106 may exchange location information while still connected via the cellular network. Based on the location information, mobile device 102 may determine the proximity of the second mobile device 106. For example, mobile device 102 may determine a distance of the second mobile device 106 based on the received location information. If the second mobile device 106 is within a threshold distance, mobile device 102 may exchange WLAN parameters with the second mobile device 106 and establish the ad hoc WLAN connection with the second mobile device 106 using the WLAN parameters. For example, negotiation and exchange of WLAN parameters may be performed while mobile devices 102, 106 are connected via the cellular network.

In certain examples, the threshold distance may be a distance over which an ad hoc WLAN connection is viable between both mobile devices 102, 106. For example, the threshold distance may be 100 m. Further, the mobile devices 102, 106 may negotiate and exchange WLAN parameters over the cellular network connection prior to establishing the ad hoc WLAN connection. For example, the mobile devices 102, 106 may exchange WLAN channel parameter, transmission power parameters, signaling parameters, and data security parameters (e.g., encryption keys) over the cellular network connection. In certain examples, cellular infrastructure 104 may provide the WLAN parameters based on a determination of the location of the mobile devices 102, 106 relative to each other.

In certain examples, if the established ad hoc WLAN connection degrades (e.g., mobile devices 102, 106 become further apart), the ad hoc WLAN connection may be gracefully downgraded to another type of communication session that can be maintained under the new conditions. For example, the ad hoc WLAN connection may be changed to a traditional cellular voice connection, a short message service (SMS) connection, or a combination thereof, which may be sustained using a lean cellular connection.

Accordingly, cellular network connection between mobile devices 102, 106 is leveraged to establish an ad hoc connection between the mobile devices 102, 106, thereby reducing power consumption of the mobile devices 102, 106, and providing a high-bandwidth connection (e.g., for video conferencing) to the users.

Figure 2:
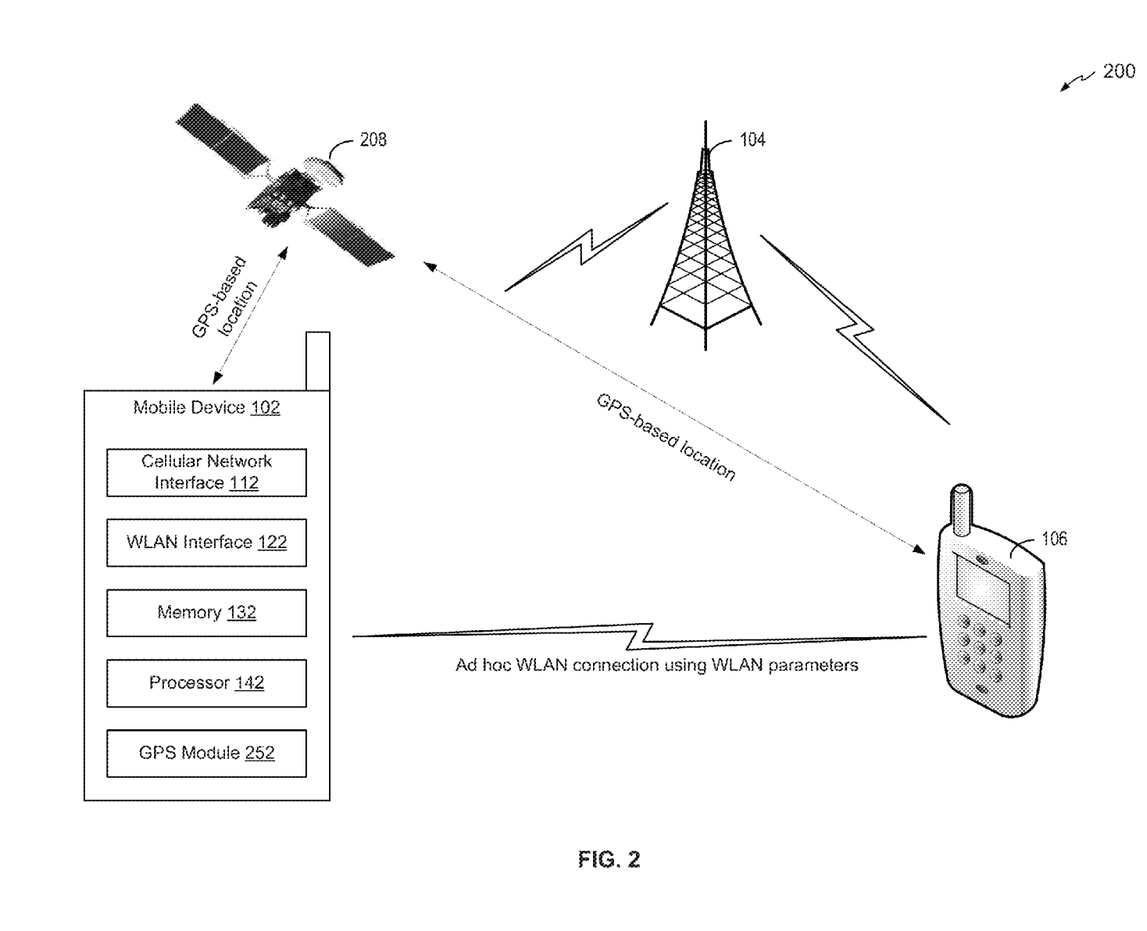
FIG. 2 is a block diagram of a mobile device for establishing an ad hoc network connection, according to one example.

FIG. 2 depicts a block diagram of a mobile device for establishing an ad hoc network connection, according to one example. In the example of FIG. 2, location information of the second mobile device 106 may be determined based on GPS based positioning, cellular based positioning, or a combination thereof.

In one example, mobile devices 102, 106 each include a GPS module 252 configured to determine a current location of corresponding mobile devices 102, 106. For example, GPS module 252 may include a GPS receiver to receive signals from a plurality of GPS satellites 208 (e.g., four or more satellites). Location of the mobile device 102, 106 may be calculated based on the received signals. Accordingly, location information may be exchanged by the mobile devices 102, 106. For example, mobile device 102 may receive location information of second mobile device 106 from the GPS module 252 of the second mobile device.

In other examples, location information of the mobile devices 102, 106 may be determined by the cellular network infrastructure 104. For example, triangulation methods may be used by the cellular network infrastructure 104 to determine the location of mobile devices 102, 106. In this example, mobile device 102 may receive location information of the second mobile device 106 from the cellular network infrastructure 104.

It should be noted that other systems may be used for determining the location of mobile devices 102, 106. Such system may include, for example, Wi-Fi based positioning systems and Bluetooth based positioning systems. Accordingly, one or more positioning systems may be used to determine the location of the mobile devices 102, 106 and the proximity of the mobile devices 102, 106 relative to each other in order to determine optimal WLAN parameters for establishing the ad hoc WLAN connection.

Figure 3:
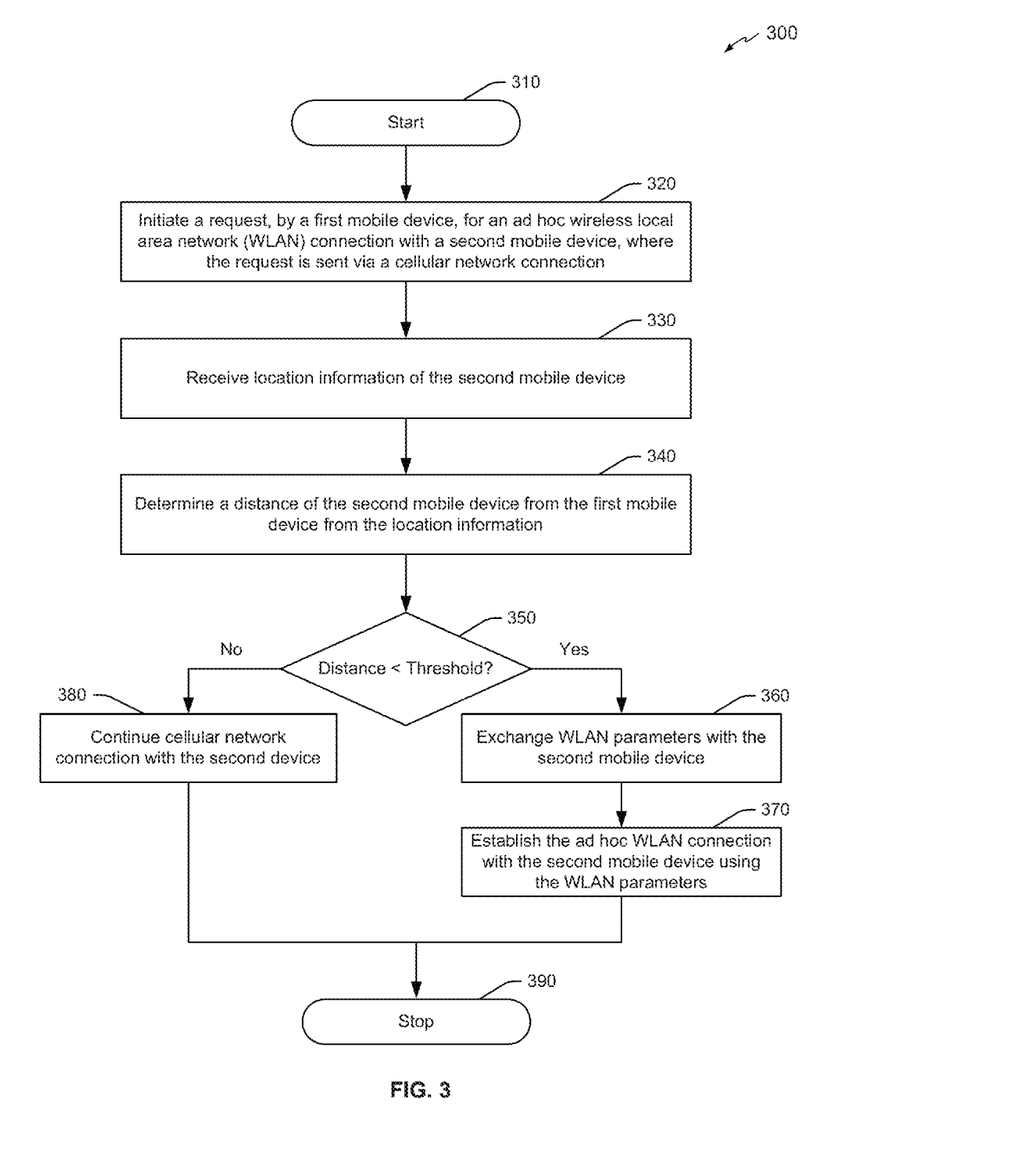
FIG. 3 is a flowchart of a method for establishing an ad hoc network connection, according to one example.

FIG. 3 is a flowchart of a method for establishing an ad hoc network connection, according to one example. Although method 300 is described below with reference to the components of FIGS. 1 and 2, other suitable components for execution of method 300 will be apparent to those of skill in the art. Additionally, the components for executing the method 300 may be spread among multiple devices. Method 300 may be implemented in the form of executable instructions stored in a non-transitory machine-readable storage medium, such as machine-readable storage medium 510 of FIG. 5, in the form of electric circuitry, or a combination thereof.

Method 300 may start in block 310 and proceed to block 320, where a request for an ad hoc wireless local area network (WLAN) connection with a second mobile device is initiated by a first mobile device. For example, mobile device 102 may establish a cellular network connection (e.g., a voice call) with second mobile device 106 and may desire to establish an ad hoc WLAN connection (e.g., a video call) with the second mobile device 106. The ad hoc WLAN connection request is made via the cellular network infrastructure 104. For example, mobile device 102 is connected to the second mobile device 106 when the request is initiated.

Method 300 may proceed to block 330, where location information of the second mobile device is received. In one example, mobile device 102 may receive location information pertaining to the second mobile device 106 from the cellular infrastructure 104. Thus, in this example, location information is determined via cellular network based positioning. In another example, mobile device 102 may receive location information of the second mobile device 106 from a GPS module 252 of the second mobile device. Thus, in this example, location information is determined via GPS based positioning.

Method 300 may proceed to block 340, where a distance of the second mobile device from the first mobile device is determined from the location information. For example, mobile device 102 may determine a proximity of the second mobile device 106 relative to the mobile device 102, based on the location information. The proximity determination may be usable to determine whether an ad hoc WLAN connection is viable and to determine WLAN connection parameters.

Method 300 may proceed to block 350, where it is determined whether the distance is below a threshold. If the distance is below the threshold, method 300 may proceed to block 360, where WLAN parameters are exchanged with the second mobile device. For example, if the distance of the second mobile device 106 to the mobile device 102 is within a predetermined threshold distance for which an ad hoc WLAN connection may be established and sustained (e.g., 100 m), mobile devices 102, 106 may exchange WLAN parameters. The WLAN parameters may include security parameters (e.g., encryption keys), power parameters (e.g., transmit power levels), and signaling parameters (e.g., channel selection), for example. It should be noted that other parameters necessary for establishing a secure WLAN connection may be exchanged between the mobile devices 102, 106. Further, the WLAN parameters are exchanged over the current cellular network connection between the mobile devices 102, 106. Moreover, in certain examples, the cellular network infrastructure 104 may determine and provide the WLAN parameters to the mobile devices 102, 106 based on the proximity of the second mobile device 106 to the mobile device 102.

Method 300 may proceed to block 370, where the ad hoc WLAN connection is established with the second mobile device using the WLAN parameters. For example, after the WLAN parameters are exchanged or provided to the mobile devices 102, 106 by the cellular network infrastructure 104, the ad hoc WLAN connection may be established based on the WLAN parameters. In one example, the ad hoc WLAN connection is an ad hoc Wi-Fi connection, where a direct Wi-Fi link is established between mobile device 102 and second mobile device 106 (e.g., no infrastructure or access points).

If however, it is determined that the distance is greater than the threshold at block 350, method 300 may proceed to block 380, where the cellular network connection with the second mobile device is maintained. Method 300 may then proceed to block 390, where the method 300 stops.

Figure 4:
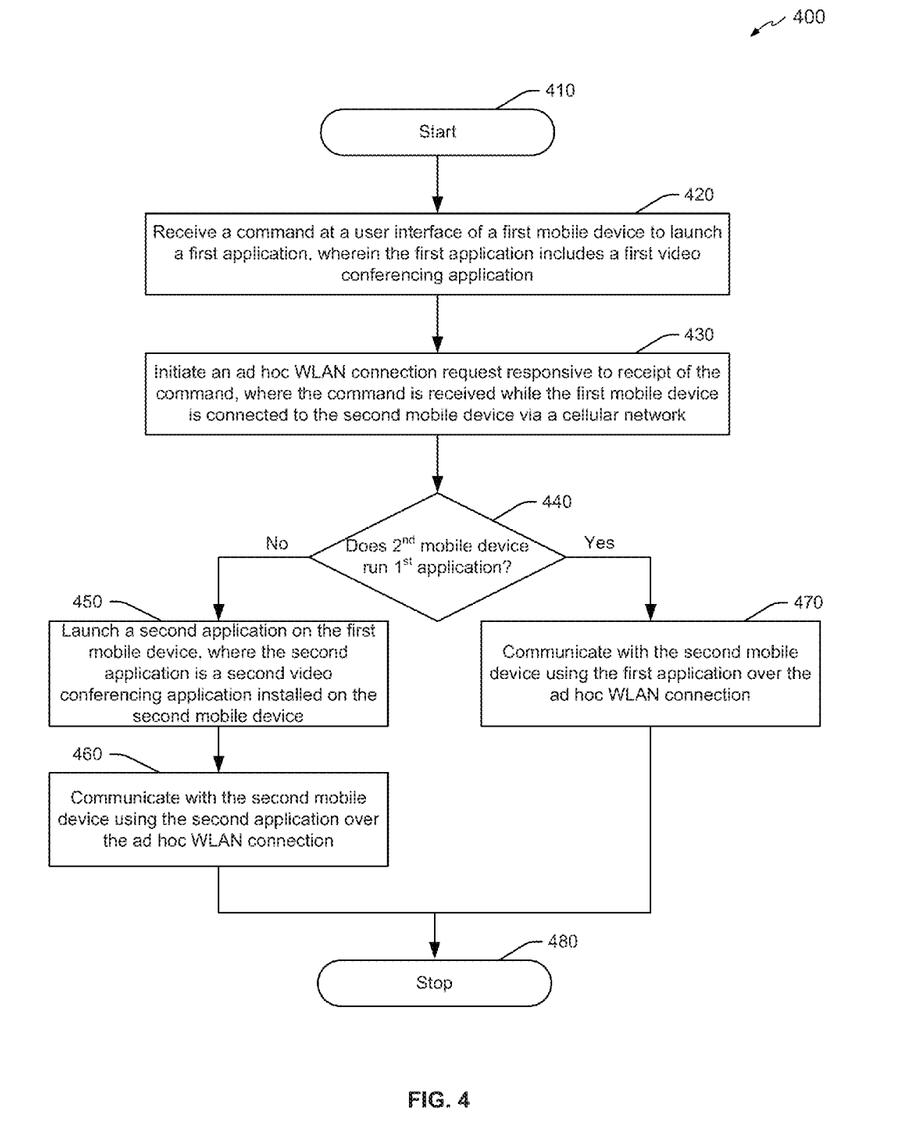
FIG. 4 is a flowchart of a method for establishing an ad hoc network connection, according to one example.

FIG. 4 is a flowchart of a method for establishing an ad hoc network connection, according to one example. Although method 400 is described with reference to the components of FIGS. 1 and 2, other suitable components for execution of method 400 will be apparent to those of skill in the art. Additionally, the components for executing the method 400 may be spread among multiple devices. Method 400 may be implemented in the form of executable instructions stored in a non-transitory machine-readable storage medium, such as machine-readable storage medium 510 of FIG. 5, in the form of electric circuitry, or a combination thereof.

Method 400 may start in block 410 and proceed to block 420, where a command to launch a first application is received at a user interface of a first mobile device, and where the first application includes a video conferencing application. For example, a user of the first mobile device 102 may desire to communicate with a user of the second mobile device 106 using a high quality/bandwidth video conferencing application. Accordingly, the first user may launch the video conferencing application at the first mobile device 102.

Method 400 may proceed to block 430, where an ad hoc WLAN connection request is initiated responsive to receipt of the command, and where the command is received while the first mobile device is connected to the second mobile device via a cellular network. In one example, the request for the ad hoc WLAN connection may be sent to the second mobile device 106 over the cellular network while both mobile devices 102, 106 are connected via the cellular network). In other examples, the request for the ad hoc WLAN connection is sent to the cellular network infrastructure 104.

Method 400 may proceed to block 440, where it is determined whether the first application is installed on the second mobile device. If it is determined that the first application is not installed on the second mobile device, method 400 may proceed to block 450, where a second application is launched on the first mobile device, and where the second application is a video conferencing application installed on the second mobile device. For example, the first mobile device 102 may query the second mobile device 106 to determine whether the first application is installed on the second mobile device 106. In another example the first mobile device 102 may query the cellular network infrastructure 104 to determine whether the first application is installed on the second mobile device 106, a second application (e.g., a video conferencing application) is launched on the first mobile device, where the second application is an application installed on the second mobile device. Method 400 may proceed to block 460, where the first mobile device communicates with the second mobile device using the second application over the ad hoc WLAN connection.

In certain examples, the second application available in the second mobile device 106 is automatically launched on the first mobile device 106. In other examples, the user of the first mobile device 102 is provided with a list of applications available on the second mobile device 106 to choose from. Accordingly, the user of the first mobile device 102 may select a second application from the list corresponding to an application available on the second mobile device 106 for video conferencing.

If, however, the first application is installed on the second mobile device, as determined in block 440, method 400 may proceed to block 470, where the first mobile device communicates with the second mobile device using the first application over the ad hoc WLAN connection. Method 400 may then proceed to block 480, where the method 400 stops.

Figure 5:
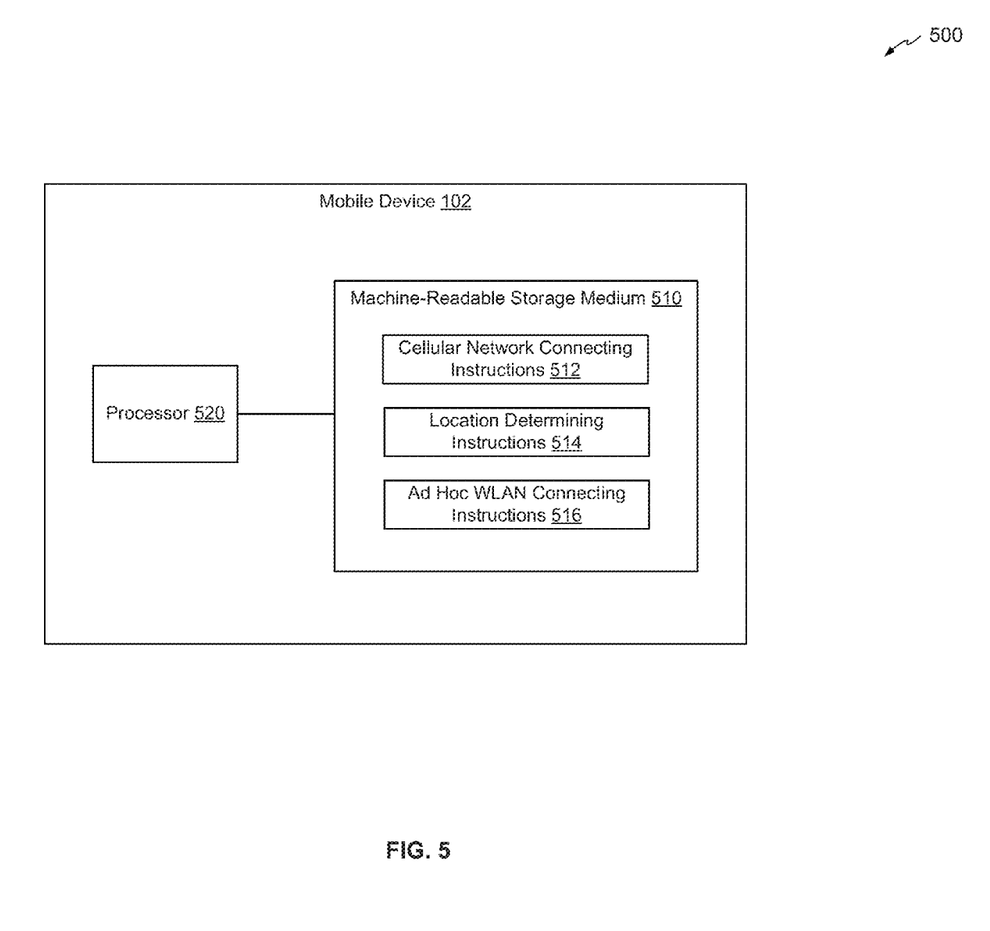
FIG. 5 is a block diagram of a non-transitory machine-readable storage medium encoded with instructions for establishing an ad hoc network connection, according to one example.

FIG. 5 is a block diagram of a non-transitory machine-readable storage medium encoded with instructions for establishing an ad hoc network connection, according to one example. FIG. 5 includes, for example, a processor 520 and a machine-readable storage medium 510 including instructions 512, 514, and 516 for establishing an ad hoc network connection. Processor 520 and machine-readable storage medium 510 may be included in mobile device 102.

Processor 520 may be a microprocessor, a semiconductor-based microprocessor, other hardware devices or processing elements suitable for retrieval and execution of instructions stored in machine-readable storage medium 510, or any combination thereof. Processor 520 may fetch, decode, and execute instructions stored in machine-readable storage medium 510 to implement the functionality described in detail below. As an alternative or in addition to retrieving and executing instructions, processor 520 may include at least one integrated circuit (IC), other control logic, other electronic circuit, or any combination thereof that include a number of electronic components for performing the functionality of instructions 512, 514, and 516 stored in machine-readable storage medium 510. Further, processor 520 may include single or multiples cores in a chip, include multiple cores across multiple devices, or any combination thereof.

Machine-readable storage medium 510 may be any non-transitory electronic, magnetic, optical, or other physical storage device that contains or stores executable instructions. Thus, machine-readable storage medium 510 may be, for example, NVRAM, Random Access Memory (RAM), an Electrically Erasable Programmable Read-Only Memory (EEPROM), a storage drive, a Compact Disc Read Only Memory (CD-ROM), and the like. Further, machine-readable storage medium 510 can be computer-readable as well as non-transitory. As described in detail below, machine-readable storage medium 510 may be encoded with a series of executable instructions for establishing an ad hoc network connection at a mobile device, for example. The executable instructions may be, for example, a portion of an operating system (OS) of the mobile device 102 or a separate application running on top of the OS to implement the ad hoc network connection. Other suitable formats of the executable instructions will be apparent to those of skill in the art.

Machine-readable storage medium 510 may include cellular network connecting instructions 512, which may be configured to initiate a request for an ad hoc WLAN connection with a second mobile device, while the first mobile device is connected to the second mobile device via a cellular network. For example, cellular network connecting instructions 512 may be executable to place a voice call to the second mobile device 106 over a cellular network (e.g., 2G, 3G, 4G, and LTE). While connected, the cellular network connection instructions 512 may be configured to initiate the request for the ad hoc WLAN connection, for example, when a user of the first mobile device 102 launches a video conferencing application to communicate with a user of the second mobile device 106.

Machine-readable storage medium 510 may include location determining instructions 514, which may be configured to receive location information of the second mobile device and to determine a distance of the second mobile device based on the location information. In certain examples, the location information of the second mobile device 106 may be received from the cellular network infrastructure 104. In other examples, the location information of the second mobile device 106 may be determined by the GPS module 252 of the second mobile device 106 and sent to the first mobile device 102. Further, location determining instructions 514 may be configured to determine a proximity of the second mobile device 106 based on the location information.

Machine-readable storage medium 510 may include ad hoc WLAN connecting instructions 516, which may be configured to exchange WLAN parameters with the second mobile device and to establish the ad hoc WLAN connection with the second mobile device using the WLAN parameters. For example, the distance derived from the location information may be compared to a predetermined threshold distance suitable for establishing and maintaining an ad hoc WLAN connection with the second mobile device. Further, WLAN parameters such as security parameters, power parameters, and signaling parameters may be sent to the second mobile device 106, where such parameters are used to establish the ad hoc WLAN connection.

What is claimed is:

1. A mobile device for establishing an ad hoc network connection, comprising:
a cellular network interface to communicate over a cellular network;
a wireless local area network (WLAN) interface to communicate over an ad hoc WLAN connection;
a processor; and
a memory storing instructions executable by the processor to:
initiate a request for an ad hoc WLAN connection with a second mobile device, wherein the request is sent via the cellular network;
receive location information of the second mobile device;

determine a distance of the second mobile device from the location information;
when the distance is within a threshold:
exchange WLAN parameters with the second mobile device;
establish the ad hoc WLAN connection with the second mobile device using the WLAN parameters;
receive a list of applications available on the second mobile device; and
communicate with the second mobile device using an application, selected from the list of applications, over the ad hoc WLAN connection.

2. The mobile device of claim 1, further comprising a global positioning system (GPS) module to determine a location of the mobile device.

3. The mobile device of claim 1, wherein the location information is received from at least one of a cellular base station of the cellular network and a GPS module of the second mobile device.

4. The mobile device of claim 1, wherein the WLAN parameters comprise at least one of encryption parameters, signaling parameters, power parameters, and security parameters.

5. The mobile device of claim 4, wherein the signaling parameters comprise at least one communication channel for the ad hoc WLAN connection.

6. The mobile device of claim 1, wherein the ad hoc WLAN connection comprises an ad hoc Wi-Fi connection.

7. The mobile device of claim 1, wherein the instructions are further executable by the processor to switch from the ad hoc WLAN connection to the cellular network when the distance exceeds the threshold.

8. The mobile device of claim 1, wherein the WLAN parameters are provided by the cellular network.

9. The mobile device of claim 1, wherein the instructions are further executable by the processor to:
receive a command at a user interface of the mobile device to launch a first application, wherein the first application comprises a first video conferencing application;
initiate the WLAN connection request, responsive to receipt of the command, wherein the command is received while the mobile device is connected to the second mobile device via the cellular network;
determine whether the first application is installed on the second mobile device;
when the first application is not installed on the second mobile device:
launch a second application on the mobile device, wherein the second application comprises a second video conferencing application installed on the second mobile device; and
communicate with the second mobile device using the second application over the ad hoc WLAN connection; and
when the first application is installed on the second mobile device, communicate with the second mobile device using the first application over the ad hoc WLAN connection.

10. The mobile device of claim 1, wherein the cellular network comprises at least one of a second generation (2G) network, a third generation (3G) network, a fourth generation (4G) network, a long term evolution (LTE) network, a code division multiple access (CDMA) network, a global system for mobile communications (GSM) network, universal mobile telecommunications system (UMTS) network, and a worldwide interoperability for microwave access (WiMAX) network.

11. A method for establishing an ad hoc network connection, comprising:
initiating, by a first mobile device, a request for an ad hoc wireless local area network (WLAN) connection with a second mobile device, wherein the request is sent via a cellular network;
receiving location information of the second mobile device;
determining a distance of the second mobile device from the first mobile device from the location information; and
when the distance is within a threshold:
exchanging WLAN parameters with the second mobile device;
establishing the ad hoc WLAN connection with the second mobile device using the WLAN parameters;
receiving a list of applications available on the second mobile device; and
communicating with the second mobile device using an application, selected from the list of applications, over the ad hoc WLAN connection.

12. The method of claim 11, comprising:
receiving a command at a user interface of the first mobile device to launch a first application, wherein the first application comprises a first video conferencing application;
initiating the WLAN connection request, responsive to receiving the command, wherein the command is received while the first mobile device is connected to the second mobile device via the cellular network;
determining whether the first application is installed on the second mobile device;
when the first application is not installed on the second mobile device:
launching a second application on the first mobile device, wherein the second application is a second video conferencing application installed on the second mobile device; and
communicating with the second mobile device using the second application over the ad hoc WLAN connection.

13. The method of claim 12, comprising communicating with the second mobile device using the first application over the ad hoc WLAN connection when the first application is installed on the second mobile device.

14. The method of claim 11, comprising determining WLAN parameters based on the distance.

15. The method of claim 11, comprising changing a communication session between the first mobile device and the second mobile device to at least one of a cellular voice session and a short message service (SMS) session, when the distance exceeds the threshold during the ad hoc WLAN connection.

16. A non-transitory computer-readable medium comprising instructions that, when executed by a processor of a mobile device, cause the mobile device to:
initiate a request for an ad hoc WLAN connection with a second mobile device, wherein the request is sent via a cellular network;
receive location information of the second mobile device;
determine a distance of the second mobile device from the location information; and
when the distance is within a threshold:
exchange WLAN parameters with the second mobile device;
establish the ad hoc WLAN connection with the second mobile device using the WLAN parameters;

receive a list of applications available on the second mobile device; and communicate with the second mobile device using an application, selected from the list of applications, over the ad hoc WLAN connection.

17. The non-transitory computer-readable medium of claim 16, wherein the location information is received from at least one of a base station of the cellular network and a global positioning system (GPS) module of the second mobile device.

18. The non-transitory computer-readable medium of claim 16, wherein the WLAN parameters comprise at least one of encryption parameters, signaling parameters, power parameters, and security parameters.

19. The non-transitory computer-readable medium of claim 16, wherein the ad hoc WLAN connection comprises an ad hoc Wi-Fi connection.

20. The non-transitory computer-readable medium of claim 16, wherein the mobile device is connected to the second mobile device via the cellular network when the request is initiated.

* * * * *